United States Patent
Wong et al.

(10) Patent No.: US 12,219,663 B2
(45) Date of Patent: Feb. 4, 2025

(54) MOBILE TELECOMMUNICATIONS SYSTEM TRANSMISSION AND RECEPTION POINTS AND METHODS FOR SWITCHING TRANSMISSION AND RECEPTION POINTS BETWEEN ACTIVE AND INACTIVE STATES

(71) Applicant: Sony Corporation, Tokyo (JP)

(72) Inventors: Shin Horng Wong, Basingstoke (GB); Martin Warwick Beale, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 490 days.

(21) Appl. No.: 17/098,482

(22) Filed: Nov. 16, 2020

(65) Prior Publication Data

US 2021/0068029 A1  Mar. 4, 2021

Related U.S. Application Data

(63) Continuation of application No. 16/321,036, filed as application No. PCT/EP2017/069755 on Aug. 3, 2017, now Pat. No. 10,841,854.

(30) Foreign Application Priority Data

Aug. 4, 2016 (EP) ..................................... 16182891

(51) Int. Cl.
*H04W 36/30* (2009.01)
*H04W 36/32* (2009.01)
*H04W 52/02* (2009.01)
*H04W 72/27* (2023.01)
*H04W 84/00* (2009.01)

(52) U.S. Cl.
CPC ....... *H04W 84/005* (2013.01); *H04W 36/324* (2023.05); *H04W 52/0206* (2013.01); *H04W 72/27* (2023.01); *Y02D 30/70* (2020.08)

(58) Field of Classification Search
None
See application file for complete search history.

(56) References Cited

U.S. PATENT DOCUMENTS

| | | | |
|---|---|---|---|
| 10,111,152 B2 * | 10/2018 | Axmon | H04W 16/28 |
| 10,841,854 B2 * | 11/2020 | Wong | H04W 36/32 |
| 2005/0020203 A1 * | 1/2005 | Losh | H04W 36/0085 |
| | | | 455/431 |
| 2009/0240464 A1 * | 9/2009 | Dietz | H04M 1/72463 |
| | | | 702/143 |

(Continued)

FOREIGN PATENT DOCUMENTS

| | | |
|---|---|---|
| CN | 102970067 A | 3/2013 |
| EP | 2640135 A | 9/2013 |
| EP | 2953419 A | 12/2015 |

OTHER PUBLICATIONS

3GPP, "Evolved Universal Terrestrial Radio Access (E-UTRA); User Equipment (UE) radio transmission and reception", ETSI TS 136 101 V10.1.1 Release 10, Jan. 2011, 200 pages.

(Continued)

*Primary Examiner* — Willie J Daniel, Jr.
(74) *Attorney, Agent, or Firm* — XSENSUS LLP

(57) ABSTRACT

A mobile telecommunications system transmission and reception point has circuitry configured to receive a status indicator, and to switch between an active state and an inactive state in response to the received status indicator.

20 Claims, 5 Drawing Sheets

(56) References Cited

U.S. PATENT DOCUMENTS

| | | | |
|---|---|---|---|
| 2009/0268828 A1* | 10/2009 | Roberts | H04L 27/2657 |
| | | | 455/517 |
| 2010/0317293 A1* | 12/2010 | Yokoyama | H04W 56/0035 |
| | | | 455/63.1 |
| 2012/0214550 A1 | 8/2012 | Galaro et al. | |
| 2013/0114488 A1 | 5/2013 | Fang et al. | |
| 2013/0143580 A1 | 6/2013 | Michel | |
| 2013/0288686 A1 | 10/2013 | Chou | |
| 2013/0303147 A1* | 11/2013 | Zhou | H04W 52/343 |
| | | | 455/418 |
| 2014/0370930 A1 | 12/2014 | Kurokochi et al. | |
| 2016/0360537 A1 | 12/2016 | Palenius et al. | |
| 2017/0171792 A1* | 6/2017 | Axmon | H04W 84/06 |
| 2017/0272931 A1 | 9/2017 | Bottari et al. | |
| 2017/0366249 A1 | 12/2017 | Van Oost et al. | |
| 2018/0020330 A1 | 1/2018 | Li et al. | |
| 2018/0316409 A1* | 11/2018 | Yoon | H04B 7/0888 |

OTHER PUBLICATIONS

3GPP, "Technical Specification Group Radio Access Network; Small cell enhancements for E-UTRA and E-UTRAN—Physical Layer aspects", 3GPP TR 36.872 V12.1.0 Release 12, Dec. 2013, 100 pages.

CMCC, "Updated summary of evaluation assumptions for NR", 3GPP TSG RAN WG1 Meeting No. 84 bis R1-163867, Busan, Korea, Apr. 11-15, 2016, 1 page.

3GPP, "New SID Proposal: Study on New Radio Access Technology", 3GPP TSG RAN Meeting # 71 RP-160671, Göteborg, Sweden, Mar. 7-10, 2016, 8 pages.

International Search Report mailed on Dec. 21, 2017 for PCT/EP2017/069755 filed on Aug. 3, 2017, 19 pages.

* cited by examiner

MOBILE TELECOMMUNICATIONS SYSTEM TRANSMISSION AND RECEPTION POINTS AND METHODS FOR SWITCHING TRANSMISSION AND RECEPTION POINTS BETWEEN ACTIVE AND INACTIVE STATES

CROSS-REFERENCE TO RELATED APPLICATIONS

This application is a continuation of U.S. application Ser. No. 16/321,036, filed Jan. 28, 2019, which is based on PCT filing PCT/EP2017/069755, filed Aug. 3, 2017, and claims priority to EP 16182891.8, filed Aug. 4, 2016, the entire contents of each are incorporated herein by reference.

TECHNICAL FIELD

The present disclosure generally pertains to mobile telecommunications system transmission and reception points and mobile telecommunication systems methods.

TECHNICAL BACKGROUND

Several generations of mobile telecommunications systems are known, e.g. the third generation ("3G"), which is based on the International Mobile Telecommunications-2000 (IMT-2000) specifications, the fourth generation ("4G"), which provides capabilities as defined in the International Mobile Telecommunications-Advanced Standard (IMT-Advanced Standard), and the current fifth generation ("5G"), which is under development and which might be put into practice in the year 2020.

A candidate for providing the requirements of 5G is the so-called Long Term Evolution ("LTE"), which is a wireless communications technology allowing high-speed data communications for mobile phones and data terminals and which is already used for 4G mobile telecommunications systems. Other candidates for meeting the 5G requirements are termed New Radio Access Telecommunications Systems (NR). An NR can be based on LTE technology, just as LTE was based on previous generations of mobile communication technology.

LTE is based on the GSM/EDGE ("Global System for Mobile Commumcations"/"Enhanced Data rates for GSM Evolution" also called EGPRS) of the second generation ("2G") and UMTS/HSPA ("Universal Mobile Telecommunications System"/"High Speed Packet Access") of the third generation ("3G") network technologies.

LTE is standardized under the control of 3GPP ("3rd Generation Partnership Project") and there exists a successor LTE-A (LTE Advanced) allowing higher data rates than the basic LTE and which is also standardized under the control of 3GPP.

For the future, 3GPP plans to further develop LTE-A such that it will be able to fulfill the technical requirements of 5G.

As the 5G system will be based on LTE or LTE-A, respectively, it is assumed that specific requirements of the 5G technologies will, basically, be dealt with by features and methods which are already defined in the LTE and LTE-A standard documentation.

Moreover, in 3GPP document RP-160671, "New SID Proposal: Study on New Radio access Technology", NTT DOCVOMO, Ran #71, a Study Item on New Radio Access Technology (NR) has been agreed upon. Subject of this Study Item is to study and to develop a new Radio Access Technology (RAT) for the next generation wireless communication system, e.g. 5G. The new RAT is expected to operate in a large range of frequencies, from hundreds of MHz to 100 GHz and it is expected to cover a broad range of use cases. The use cases that are considered under this Study Item are Enhanced Mobile Broadband (eMBB), Massive Machine Type Communications (mMTC) and Ultra Reliable & Low latency Communications (URLLC).

In addition to the large range of services, the NR is also expected to be deployed in different environments, wherein an example of such a deployment is for a high speed train, as discussed in 3GPP document R1-163867, "Updated summary of evaluation assumptions for NR", CMCC, RAN1 #84bis, where the UE is expected to support a speed of up to 500 kmph. The operating carrier frequencies for high speed trains in NR being considered are 4 GHz and 30 GHz.

Although there exist techniques for provide signaling for moving user equipments, it is generally desirable to improve the existing techniques.

SUMMARY

According to a first aspect, the disclosure provides a mobile telecommunications system transmission and reception point comprising circuitry configured to receive a status indicator; and switch between an active state and an inactive state in response to the received status indicator.

According to a second aspect, the disclosure provides a mobile telecommunications system transmission and reception point comprising circuitry configured to transmit a status indicator for switching another transmission and reception point between an active state and an inactive state.

According to a third aspect, the disclosure provides a mobile telecommunications system base station comprising multiple remote radio heads and circuitry configured to receive a status indicator; and deactivate selectively the multiple remote radio heads based on the received status indicator.

According to a fourth aspect, the disclosure provides a mobile telecommunications system method composing obtaining neighbor cell information including priority information of neighboring cells to be measured; and measuring cells based on the priority information.

According to a fifth aspect, the disclosure provides a mobile telecommunications system method for a transmission and reception point serving a user equipment, comprising obtaining a speed related parameter of the served user equipment; and compensating for a Doppler effect in a wireless link communication to the served user equipment, based on the obtained speed related parameter.

According to a sixth aspect, the disclosure provides a mobile telecommunications system method for a user equipment served by a transmission and reception point, comprising receiving a speed related parameter of the served user equipment from the transmission and reception point; and compensating for a Doppler effect in a wireless link communication to the transmission and reception point, based on the obtained speed related parameter.

Further aspects are set forth in the dependent claims, the following description and the drawings.

BRIEF DESCRIPTION OF THE DRAWINGS

Embodiments are explained by way of example with respect to the accompanying drawings, in which.

DETAILED DESCRIPTION OF EMBODIMENTS

Figure 1:
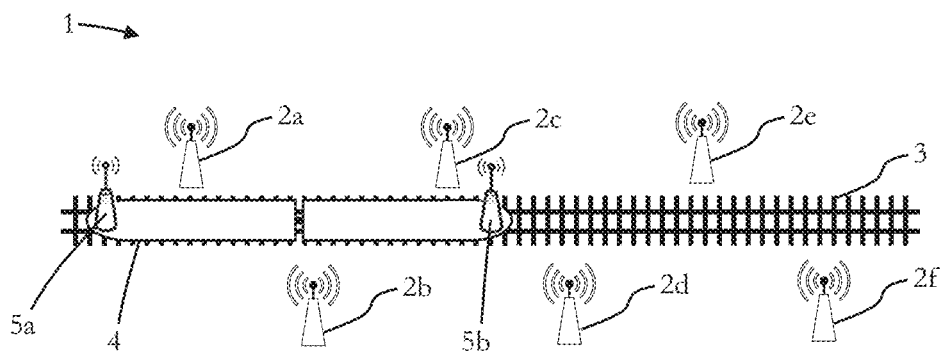
FIG. 1 illustrates a radio access network and a train on a track.

Before a detailed description of the embodiments under reference of FIG. 1, general explanations are given.

As mentioned in the outset, several generations of mobile telecommunications systems are known, e.g. the third generation ("3G"), which is based on the International Mobile Telecommunications-2000 (IMT-2000) specifications, the fourth generation ("4G"), which provides capabilities as defined in the International Mobile Telecommunications-Advanced Standard (IMT-Advanced Standard), and the current fifth generation ("5G"), which is under development and which might be put into practice in the year 2020.

A candidate, in some embodiments, for providing the requirements of 5G is the so-called Long Term Evolution ("LTE"), which is a wireless communications technology allowing high-speed data communications for mobile phones and data terminals and which is already used for 4G mobile telecommunications systems. Other candidates for meeting the 5G requirements are termed New Radio Access Telecommunications Systems (NR). An NR can be based on LTE technology, just as LTE was based on previous generations of mobile communication technology.

LTE is based on the GSM/EDGE ("Global System for Mobile Communications"/"Enhanced Data rates for GSM Evolution" also called EGPRS) of the second generation ("2G") and UMTS/HSPA ("Universal Mobile Telecommunications System"/"High Speed Packet Access") of the third generation ("3G") network technologies.

LTE is standardized under the control of 3GPP ("3rd Generation Partnership Project") and there exists a successor LTE-A (LTE Advanced) allowing higher data rates than the basic LTE and which is also standardized under the control of 3GPP.

For the future, 3GPP plans to further develop LTE-A such that it will be able to fulfill the technical requirements of 5G.

As the 5G system will be based on LTE or LTE-A, respectively, it is assumed that specific requirements of the 5G technologies will, basically, be dealt with by features and methods which are already defined in the LTE and LTE-A standard documentation in some embodiments.

Moreover, in 3GPP document RP-160671, "New SID Proposal: Study on New Radio access Technology", NTT DOCVOMO, Ran #71, a Study Item on New Radio Access Technology (NR) has been agreed upon. Subject of this Study Item is to study and to develop a new Radio Access Technology (RAT) for the next generation wireless communication system, e.g. 5G. The new RAT is expected to operate in a large range of frequencies, from hundreds of MHz to 100 GHz and it is expected to cover a broad range of use cases. The use cases that are considered under this Study Item are Enhanced Mobile Broadband (eMBB), Massive Machine Type Communications (mMTC) and Ultra Reliable & Low Latency Communications (URLLC).

In addition to the large range of services, the NR is also expected to be deployed in different environments, wherein an example of such a deployment is for a high speed train, as discussed in 3GPP document R1-163867, "Updated summary of evaluation assumptions for NR", CMCC, RAN1 #84bis, where the UE is expected to support a speed of up to 500 kmph. The operating carrier frequencies for high speed trains in NR being considered are 4 GHz and 30 GHz.

A general setup, which is used in some embodiments, is illustrated in FIG. 1.

A 5G Radio Access Network (RAN) has multiple Transmission and Reception Points (TRP) 2a-f or base stations 2a-f, which are deployed along a railway track 3 to provide a line-of-sight (LOS) coverage for a train 4. In some embodiments, a base station comprises one or more TRPs.

In the exemplary embodiment of FIG. 1, at each end of the train 4, a respective UE 5a (left side in FIG. 1) and 5b (right side in FIG. 1) is provided such that the train speed and the speed of the UEs 5a and 5b are identical.

Antennas of the TRPs 2a-f may be directed towards the railway track 3 with the aim of providing maximum coverage for the train 4 and UEs 5a and 5b mounted on the train. Due to the direction towards the railway track 3, it is unlikely, in some embodiments, that such TRPs 2a-f serve UEs which are not travelling along the railway track 3, such as pedestrians outside of the railway track.

Since a TRP 2a-f would typically serve the train 4 only for a short time period, especially for high speed trains, it has been recognized that the TRP needs to only be active for a short time period and it would be a waste of energy to keep such a TRP active when there is no train passing through its coverage. Hence, some embodiments provide an energy efficient way of operating such TRPs.

Consequently, some embodiments pertain to a mobile telecommunications system transmission and reception point (TRP) comprising circuitry configured to receive a status indicator; and switch between an active state and an inactive state in response to the received status indicator.

As mentioned, the mobile telecommunications system may be a 5G, e.g. LTE-A or NR, mobile telecommunication system or the like.

The TRP may be included in a base station, such as an eNodeB or the like, it may be part of a base station or it may be a base station. In some embodiments, a base station may include multiple TRPs.

The status indicator includes at least one of and/or may be indicative of at least one of: a command to switch between an inactive or active state, connection state information, information about a completed handover procedure, end of vehicle information, train speed or the like.

In some embodiments, the TRP serves one or more user equipments, which are mounted on a vehicle, such as a train and as also discussed above under reference of FIG. 1.

The user equipment may be a mobile phone, a smartphone, computer, tablet, tablet personal computer or the like including a mobile communication interface, or any other device which is able to perform a mobile telecommunication via, for example, LTE(-A), such as a hot spot device with a mobile communication interface.

In some embodiments, the active state includes functions of at least one of receiving and transmitting data, e.g. from and to a user equipment. The inactive state may include at least one of discontinuous reception mode and discontinuous transmission mode. The inactive state may include turning off at least one of a transmitter and receiver of the TRP.

The circuitry may be further configured to transmit a status indicator.

The circuitry may be further configured to switch into the inactive state after a predetermined time.

Some embodiments pertain to a mobile telecommunications system transmission and reception point comprising circuitry configured to transmit a status indicator for switching another transmission and reception point between an active state and an inactive state.

The circuitry may be further configured to transmit the status indicator to a neighboring transmission and reception point.

The circuitry may be further configured to detect a mobility of a user equipment, the user equipment being mounted to a vehicle, such as a train, as discussed above.

The circuitry is further configured to detect a movement direction of the vehicle and, thus, e.g. of equipment mounted to the vehicle. Thereby, the status indicator can be transmitted along the movement direction of the vehicle.

The one or more other transmission and reception points may be neighboring to the mobile telecommunications system transmission and reception point, such that the one more other transmission and reception points may be in the direction of travel of the vehicle.

The status indicator may be transmitted to a number of other transmission and reception points, and the number of the other transmission and reception points may depend on the velocity of the vehicle. In some embodiments, the number of other transmission and reception points may also depend on the direction of travel of the vehicle.

Some embodiments pertain to a mobile telecommunications system base station composing multiple remote radio heads and circuitry configured to receive a status indicator and deactivate (and/or activate) selectively the multiple remote radio heads based on the received status indicator.

The status indicator may be received from a neighboring base station, as also mentioned above.

The deactivation of the multiple remote radio heads may be further based on a geographical relationship to the neighboring base station. For example, closer remote radio heads may be deactivated while remote radio heads which are farther away stay active.

The status indicator may indicate a last activated remote radio head of the neighboring base station. Thereby it can be determined whether and which remote radio heads of the present base station may be activated.

The outermost remote radio heads of a base station may stay in the active state. Thereby, for example, a seamless handover to remote radio heads of a neighboring base station can be performed.

The circuitry of the present base station or another base station may be further configured to detect an active remote radio head, based on a signal measurement. The signal measurement may include at least one of: receiving uplink signals, sounding reference signals, physical uplink shared channel, ACK/NACK feedback signaling. The deactivation of the multiple remote radio heads may be further based on the signal measurement. The signal measurement may be performed by a user equipment and, for example, the result may be transmitted to the base station, e.g. in the case where the base station transmits downlink signals, such as reference signals or synchronization signals. In the case that the user equipment transmits the signals mentioned above (i.e. uplink signals, sounding reference signals, etc.), the base station may receive the signals and perform the measurement. Hence, in some embodiments, the remote radio heads of the present base station may be activated or deactivated either by the base station itself or by another base station which performed or received the signal measurements and detected active radio remote heads on the another base station.

The remote radio heads may be uniquely identifiable. Thereby, each remote radio head may be deactivated and activated selectively and separately from other radio remote heads.

Returning to FIG. 2, there is the RAN 1 of FIG. 1 illustrated, wherein the train 4 travels from left to right in FIG. 2 (see also arrow depicted on train 4).

In this embodiment, an active state and an inactive state are defined for the TRPs 2a-f.

Figure 2:
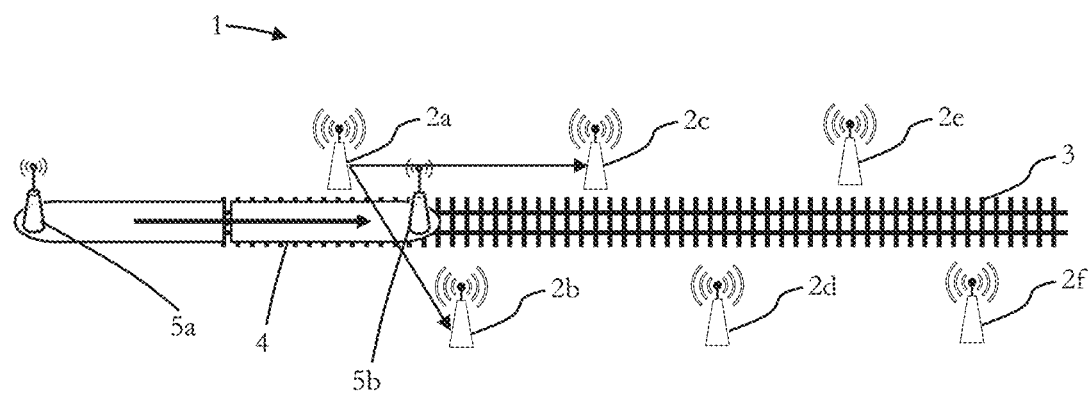
FIG. 2 illustrates signaling of a status indicator in the network of FIG. 1.

As discussed above, a status indicator, e.g. an activate indicator, is introduced, which is sent from an active state TRP to one or more inactive state TRP(s) such that these TRPs transit from inactive to active state. This is illustrated in FIG. 2. The TRP 2a is in an active state and transmits the status indicator to TRPs 2b and 2c, which are in an inactive state (see also arrows from TRP 2a to TRPs 2b and 2c).

In the present embodiment, the mobility is determined, such as the direction of the UEs 5a and 5b, wherein the UEs 5a and 5b may be located in the train or they may act as a relay attached to the outside of the train. The direction of the train 4 and, thus, of UEs 5a and 5b, can be predicted, since the train 4 has to travel along the railway track 3.

Hence, TRP 2a, which is in the active state and serves the UEs 5a and 5b of the train 4, knows the direction of travel of the train 4, and thus sends the status/activate indicator to the next two TRPs 2b and 2c, which are located in the movement direction of the train 4, and thus, of UEs 5a and 5b. Thereby, i.e. upon receipt of the status indicator, these neighboring TRPs 2a and 2b transit or switch from the inactive to the active state so that they are ready to serve the UEs 5a and 5b of the incoming train 4.

In the present embodiment, the first TRP 2a also knows the speed of the train 4 and it uses the speed to determine the number of neighbor TRPs which need to be activated to provide smooth coverage for the train 4.

In contrast to this embodiment, the UE mobility is more difficult to predict in a coverage of an urban/suburban area and in cases where the UE distribution is not within a fixed known location, as is the case for the embodiment of FIGS. 1 and 2.

As mentioned above, in the present embodiment, in the active state the TRP is transmitting and/or receiving and in the inactive state the TRP is in a DRX and/or DTX mode.

In another embodiment, in the inactive state the TRP transmitter and/or receiver are turned off, For example, a fronthaul transmitter providing an interface from the network to the UEs is turned off, while the backhaul, along which "status/activate indicators" are transmitted and which includes other interfaces, is still active. As is generally known, the TRPs or base stations are connected to each other via the backhaul and the status/activate indicator can be transmitted over the backhaul connection between the TRPs.

Moreover, an active TRP can transit or switch back into an inactive state if it does not detect any traffic, e.g. UE or train, within a predefined period of time or it switches back upon receipt of a status indication including a deactivate indication, e.g. from the network, for example, from another TRP. For example, once the UE 5*b* has connected to the TRP 2*b* in FIG. 2, TRP 2*b* can send a status indicator including deactivate indication to TRP 2*a*.

In another embodiment, an active TRP, e.g. a first TRP, sends status indicator(s) to other TRPs, e.g. a second TRP, in order to indicate that it has connected with the train 4 and the UEs 5*a* and 5*b*, respectively. For example, referring to FIG. 2, TRP 2*a* can send status indications including activation indicators to TRPs 2*b* and 2*c*. Once the train 4 (UEs 5*a* and 5*b* respectively) connects to the TRP 2*c*, the TRP 2*c* sends a status indicator including a "connection indication" to the first TRP 2*a*. Once TRP 2*a* receives the status indicator including the connection indication, the TRP 2*a* switches into the inactive state.

In another embodiment, a TRP moves to an inactive state once it has handed over a UE belonging to the train to another TRP.

For example, referring to FIG. 2, TRP 2*a* sends status indications including activation commands to TRPs 2*b* and 2*c*. The UE(s), e.g. UEs 5*a* and/or 5*b* on the train perform handover measurements. Once, for example, the UE 5*a* performs a handover measurement with significant quality, TRP 2*a* performs a handover of the UE 5*a* to the TRP 2*b*. Once this handover is complete, this is known to TRP 2*a* since it receives a message (e.g. status indicator) from TRP 2*b* indicating that the UE context of UE 5*a* has been transferred to TRP 2*b*. For example, TRP 2*b* can send a "UE Context Release" message (status indicator) to TRP 2*a*, wherein TRP 2*a* returns/switches to the inactive state upon receipt of the "UE Context Release" message.

It will be understood that in some embodiments, an implementation may be more complex than described above. For example, on a congested railtrack, TRP 2*c* may indicate to TRP 2*b* that it can move to an inactive state, e.g. in accordance with one of the embodiments discussed above, but TRP 2*b* might have been informed by TRP 2*a* that it needs to switch into an active state due to a following train. In this ease, the TRPs may implement an algorithm that prioritizes being in an active state over returning to an inactive state.

Figure 3:
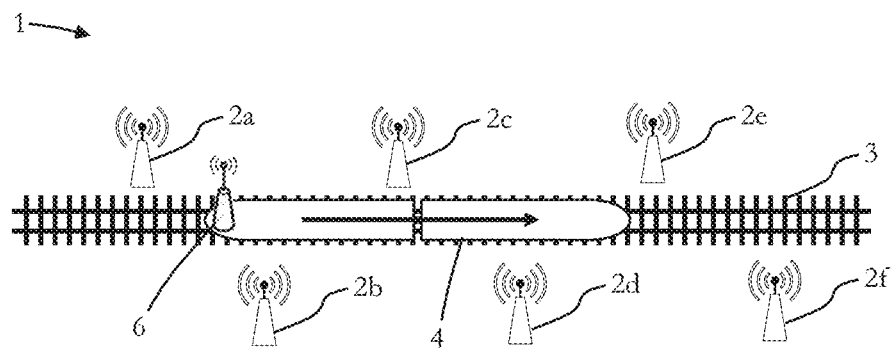
FIG. 3 illustrates train movement in the network of FIG. 1.

In another embodiment, which is explained under reference of FIG. 3, an "End of Train" indicator (status indicator) is sent by a relay UE 6 at the last carriage of the train 4 to the serving TRP 2*a* (the setup of the RAN 1 corresponds to the RAN 1 of FIGS. 1 and 2 explained above). The status indicator (end of train indicator) indicates that the receiving TRP, i.e. TRP 2*a* in the present example, can switch to the inactive state.

In some embodiments, upon receipt of a status indicator such as the end of train indicator, a timer for switching to the inactive state can be started or it is switched to the inactive state if additionally, a reported measured (Downlink) signal goes below a threshold.

As can be taken from FIG. 3, the relay UE 6, which is attached to the end of the last carriage of the train 4, transmits the "End of Train" indicator when it passes the TRP 2*a*, e.g. when its measured downlink signal is below a threshold. This will aid the active TRP(s), i.e. TRP 2*a*, to determine when to switch to the inactive state. Alternatively, the UE 6 at the end of the train 4 will continually transmit an "end of train" indicator and when the connection to that UE 6 is lost or its signal quality falls below a certain level (e.g. as measure by an active TRP, such as TRP 2*a*), an active TRP, such as TRP 2*a*, can determine that it shall switch to the inactive state.

In some embodiments, TRPs which are close to a train station or other location, where, for example, multiple trains pass by, can be permanently active (or active most of the time). When the TRP detects an incoming train (or UE), it will send status indicator including Activate Indications, as discussed above, to its neighboring inactive TRPs in the direction of travel of the train. In some embodiments, an active TRP has an updated list of neighboring TRPs that are active or inactive and hence it only needs to send the status indicators, e.g. Activate Indicator, to inactive TRPs.

The status indicators, e.g. Activate Indicator, are only sent to TRPs that are in the direction of travel (in a forwards sense) of the train.

In another embodiment, the status indicator, such as the Activate Indicator, is sent from a server rather than directly from another active TRP. For example in FIG. 2 or 3, when TRP 2*a* is active, it can indicate to a server the direction and speed of the train 4 and the server decides which other TRPs shall be activated and transmits to them a respective status indicator over the backhaul.

In another embodiment, the status indicator, such as the Activate Indicator, is sent from a network element that connects network elements at a lower level of hierarchy. For example, the status indicator, such as the Activate Indicator, is sent from a Mobility Management Entity (MME) to eNodeBs (acting as TRPs) that are connected to the MME. In another example, related to the 3G architecture, the Activate Indicator is sent from an RNC to a NodeB that is connected to the RNC.

As discussed, the TRP discussed above can either be a base station, e.g. having a functionality equivalent to an LTE eNodeB, it can be part of a base station or it can also be a remote radio head (RRH).

An RRH may have at least one of the following architectures:

A set of antennas and amplifiers (in the transmit and receive directions) that are linked via a backhaul to a baseband processing unit; and/or antennas, amplifiers and baseband processing units that are linked via a backhaul to a processing unit (where the "processing unit" performs such functions as scheduling, MAC processing, transport channel processing etc. (noting that the layer 1 processing can be split between physical channel processing functions and transport channel processing functions: the physical channel processing functions can be performed at the RRH and the transport channel processing functions can be performed in the processing unit)).

In some embodiments, as will discussed under reference of FIG. 4 in the following, the TRPs are RRHs connected to the eNodeB. In brief, the eNodeB turns the RRHs on and off that are under the control of the eNodeB (via an "intra-eNodeB Activate Indicator", which can be a status indicator as described herein). When a train reaches the last RRHs that are controlled by an eNodeB, the source eNodeB can send an Activate Indicator to the next eNodeB along the railtrack (the target eNodeB). The Activate Indicator can indicate which RRHs attached to the source eNodeB were the last active RRHs. This can help the target eNodeB to determine which RRHs to activate under its control.

Figure 4:
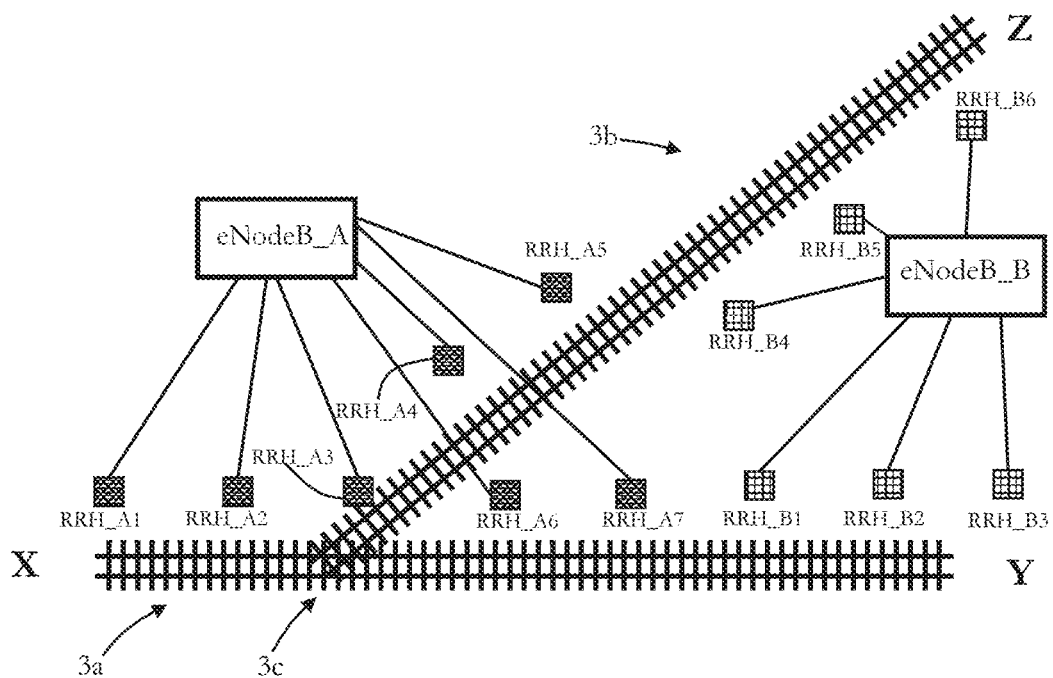
FIG. 4 illustrates eNodeBs with multiple remote radio heads.

FIG. 4 illustrates a first base station eNodeB_A and a second base station eNodeB_B.

The eNodeB_A has seven RRHs, namely RRH_A1 to RRH_A7, connected to it and the eNodeB_B has six RRHs connected to it, namely RRH_B1 to RRH_B6.

The eNodeB_A and eNodeB_B are located along two tracks 3a and 3b, which have a rail junction 3c. The two eNodeBs and their associated RRHs cover the area of the rail junction 3c.

For a train travelling in the direction from X to Y, the eNodeB_A sends status/activate indicators ("intra-eNodeB activate indicators") sequentially to the RRHs along the direction the train travels past RRH_A1, RRH_A2, RRH_A3, RRH_A6, and RRH_A7. As the train passes RRH_A7, eNodeB_A sends an Activate Indicator (and "inter-eNodeB activate indicator") to the eNodeB_B.

In the following, several scenarios are discussed:

In a first scenario, the eNodeB_A has knowledge of the RRH locations of RRH_B1 to RRH_B6 of the eNodeB_B and in the Activate Indicator sent to the eNodeB_B, the eNodeB_A indicates that RRH_B1 should be activated, which is the next RRH in the travel direction of the train after RRH_A7.

In a second scenario, the eNodeB_B has knowledge of the RRH locations RRH_A1 to RRH_A7 of eNodeB_A and the eNodeB_A sends an Activate Indicator that states that the RRH currently in use by eNodeB_A is RRH_A7. As the eNodeB_B knows the locations of the RRHs of the eNodeB_A, the eNodeB_B can determine that the following RRH after RRH_A7 is RRH_B1 and thus, eNodeB_B activates RRH_B1, which is the RRH which is located closest to RRH_A7 of eNodeB_A.

In a third scenario, there is no mutual knowledge about the RRH locations between eNodeB_A and eNodeB_B, but the eNodeBs know their relative geographic locations, e.g. the relative geographic locations of the eNodeBs with respect to each other. In this case, when eNodeB_A sends an Activate Indicator to the eNodeB_B, the eNodeB_B activates all of its connected RRHs that are close to the eNodeB_A, i.e. in the example of FIG. 4, the eNodeB_B activates RRH_B1 and RRH_B4. Moreover, the eNodeB_B can deactivate one of RRH_B1 or RRH_B4 once a train passes the other RRH, e.g. if a train passes RRH_B1, a deactivation message can be sent to RRH_B4 and vice versa.

Moreover, in an embodiment, when an eNodeB controls multiple RRHs, the RRHs at the geographic limits of the eNodeB are always active and the eNodeB activates/deactivates only the inner RRHs. Hence, the outer RRHs are always active to allow for trains handing over from eNodeB to eNodeB, but the inner RRHs can be activated/deactivated to save energy.

Based on the example of FIG. 4 this means:

For eNodeB_A, RRH_A1, RRH_A5 and RRH_A7 are always active, whereas RRH_A2, RRH_A3, RRH_A4 and RRH_A6 can be activated/deactivated as discussed. For eNodeB_B, RRH_B1, RRH_B4, RRH_B3 and RRH_B6 are always active, whereas RRH_B2 and RRH_B5 can be activated/deactivated This embodiment allows to simplify handover signaling between the eNodeBs while still allowing energy saving.

In the above embodiments pertaining to RRHs, it may also be implemented that the eNodeB can determine which RRHs are currently active based on signal quality measurements from the RRHs. For example, the UE (on the train) may transmit uplink (UL) signals, such as sounding reference signals (SRS), physical uplink shared channel (PUSCH) and/or ACK/NACK feedback signaling (e.g. carried on a Physical Uplink Control Channel: PUCCH). The RRH can perform signal quality measurements related to these UL signals and send them to the eNodeB. The eNodeB may then compare these quality measurements to determine which RRHs should be activated and deactivated.

In another embodiment, the quality measurements are determined by the UE (based on downlink signals) and reported back to the eNodeB. E.g. signals from the RRHs are uniquely identifiable (e.g. reference signals, such as cell-specific reference signals (CRS) or channel state information reference signals (CSI-RS), from one RRH are different to the reference signals from another RRH: the reference signals can be transmitted from a different antenna port, or be scrambled with a different code). Based on the feedback signals from the UE (e.g. transmitted via channel state information, CSI, or RRC measurement reports), the eNodeB can determine which RRHs are to be activated and which are to be deactivated.

In some embodiments, not all TRPs respond to status indicators, such as Activate Indicators. For example, some TRPs serve both trains and signaling or other safety equipment. Those TRPs that serve signaling/safety equipment may remain permanently active and hence ignore any Activate Indicators that tell it to deactivate.

Some embodiments pertain to a mobile telecommunications system method, which is discussed in the following also under reference of FIG. 5 and which is applicable, for example, to the RAN of FIGS. 1 to 4. Before discussing the embodiment of FIG. 5, general explanations are given.

In some embodiments, a mobile telecommunications system method comprises obtaining (e.g. receiving or generating) neighbor cell information including priority information of neighboring cells to be measured; and measuring cells based on the priority information. The neighboring cells may be located along a direction of a travelling vehicle, e.g. a train, as also discussed above. The neighboring cell information may be indicative of cells for vehicles having different travel directions. The neighboring cell information may be separated for vehicles having different travel directions. The neighboring cell information may be updated based on the travelling direction. The neighboring cell information may be obtained by a neighboring cell measurement, which may be performed by a user equipment.

Returning to FIG. 5, a train travelling at a speed of 500 kmph in a cell with a diameter of 1 km will pass through the cell in 7 seconds, e.g. in the RAN 1 of FIGS. 1 to 4 of the present disclosure. The handover process, which has also been discussed above, may take some time, and hence, in some embodiments, there is a need to optimize how the UE on the train performs neighbor cell measurements (for the purposes of handover). In addition, based on the above description (of how TRPs can be activated and deactivated), some TRPs may be deactivated, and thus, it may be a waste of time for the UE to perform measurements on those cells where the TRPs are activated.

Figure 5:
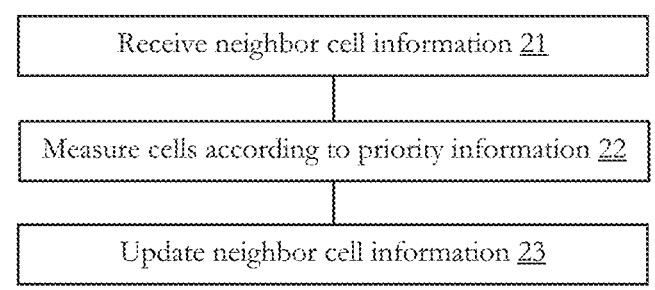
FIG. 5 illustrates a mobile telecommunications system method.

In the embodiment of FIG. 5, the mobile telecommunications method 20 may improve the neighbor cell measurement process.

In this embodiment, neighbor cell list information, e.g. a neighbor cell list, is implemented, according to which neighbor cells within the neighbor cell lists each have a priority associated with them.

Such neighbor cell information is obtained at 21 in FIG. 5. In some embodiments, the neighbor cells within the neighbor cell lists are listed separately for trains travelling in different directions. For example, for a single track traversing the cell (e.g. in an east-west direction), separate neighbor cells are listed for trains travelling in an eastwards direction and for trains travelling in a westwards direction. More generally, there may be multiple rail routes crossing the cell and the neighbor cell lists may indicate the priority of neighbor cell measurements for each rail route.

At 22, the cells are measured, e.g. by a user equipment (e.g. UE 5a or 5b discussed above), based on the priority information included in the neighbor cell list, i.e. the UE measures the neighbor cells in the order of priority in the neighbor cell list (e.g. the neighbor cell list is ranked in priority order).

At 23, the neighbor cell lists are updated dynamically based on the direction in which trains are travelling. For example, for trains travelling in a westwards direction, the neighbor cell lists are updated to only include neighbor cells west of the approaching train and neighbor cells east of the train are either irrelevant to the westward-bound train or have previously been deactivated, as has also been discussed for the embodiments of FIGS. 1 to 4.

In an embodiment, the UE itself prioritizes the cells that it performs neighbor cell measurements on, such that the UE itself obtains the neighbor cell information including priority information of neighboring cells to be measured. For instance, the UE on the train (e.g. UE 5a or 5b on train 4, as discussed above) performs measurements on neighbor cells that it has not previously passed in preference to neighbor cells that it has previously passed.

In some embodiments, related to performing neighbor cell measurements, a prior-art UE may increase the frequency of neighbor cell measurements that it performs when the signal quality of the measurements drops below a threshold. In some embodiments, e.g. for a high speed train, the UE can quickly traverse from areas of good signal coverage to areas of poor signal coverage. Hence, when the UE is travelling at a high speed, in some embodiments, the UE always performs neighbor cell measurements at a high rate and does not change the rate of neighbor cell measurements as a function of measured signal quality.

In UMTS, the RNC can send a 1 bit power saving indicator to the base station, e.g. NodeB (NB). However, this indicator is not a specific command to turn the NB off, since the UMTS NB is not designed to be turned off. This indicator is initiated by the RNC without any specified cause. In contrast to this, in some of the embodiments discussed above, the status indictor, such as the Activate Indicator, is a specific command to (de)activate a known inactive/active TRP and it is initiated directly or indirectly by an active NB upon detection of incoming traffic.

In a 3GPP Study Item on small cells (see exemplary TR36.872, "Small cell enhancement tor E-UTRA and E-UTRAN—Physical Layer aspects" (Release 12), ETSI), there was a proposal to semi-statically turn on/off a small cell based on traffic load. According to this proposal, a turned-off small cell may be turned on if the traffic load in a neighborhood of the cell (including the cell itself) increases to a certain level. Conversely, a turned-on small cell may be turned off if the traffic load in a neighborhood of the cell decreases to a certain level. A small cell is typically deployed as hot spot with an overlaid macro cell (i.e. a HetNet deployment) and hence the small cell would be used to relieve the traffic load of the macro cell. In such a scenario, the direction of the UE is not taken into account. In contrast to this, according to some embodiments discussed herein, the direction of travel of the UE is the main reason for turning on an adjacent TRP.

In the following, embodiments are discussed taking the known Doppler Effect into account.

Doppler is a function of the relative speed between receiver and transmitter and hence a consequence of deploying the TRPs along the railway line is that it would cause very high Doppler between the TRP and the train, especially if the train is moving towards or away from a TRP as shown in FIG. 1 discussed above, where the train 4 travels from left to right, and, for example, UE 5b moves towards TRP 2d and away from TRP 2c.

In LTE the UE is expected to tolerate a frequency error of no more than 750 Hz or 5% of the sub-carrier spacing (15 kHz) for high speed trains (see exemplary in TS36.101, "3GPP: E_UTRA UE Radio Transmission & Reception (Release 13)", v13.3.0).

If one assumes a 100 Hz frequency offset error at the UE, then the maximum Doppler is about 650 Hz. In contrast, the expected high speed train deployment for NR has a Doppler of 1851 Hz and 13,888 Hz at 4 GHz and 30 GHz, respectively, which are significantly higher than that of LTE. In order to operate at such high Doppler, a higher density of Reference Signals (e.g. a RS at every symbol) and wider subcarrier spacing might be required (so that these high Dopplers are less than 5% of subcarrier spacing). It has been recognized that a wide subcarrier spacing would lead to a short symbol duration. Whilst a short symbol duration may be acceptable for a high complexity UE, it is not acceptable for low complexity devices, such as MTC devices, since it would require high processing speed to process the shorter symbols, which may not be practical in such MTC devices.

Consequently, some embodiments pertain to mobile telecommunications system methods which may allow low cost devices to operate at high Doppler speeds in a high speed vehicle or train scenario.

Some embodiments pertain to a mobile telecommunications system method for a transmission and reception point serving a user equipment, comprising obtaining a speed related parameter of the served user equipment; and compensanng for a Doppler effect in a wireless link communication to the served user equipment, based on the obtained speed related parameter. The speed related parameter may be indicative of a Doppler effect. The speed related parameter may be indicative of a maximum speed of the user equipment, wherein the maximum speed may be the maximum speed between a transmission and reception point and the served user equipment. The speed related parameter may be an indicator of an average Doppler frequency shift. The method may further include transmitting the speed related parameter of the served user equipment to at least one neighboring transmission and reception point. It may further include determining a current speed of the served user equipment. The compensation may be further based on the current speed, wherein the current speed may be determined based on a measurement performed by the user equipment. The current speed may be determined based on a radio measurement between the user equipment and the serving transmission and reception point. The current speed may be determined based on a location information. The transmission and reception point may be configured to communicate in a forward and backward direction along a movement direction of the served user equipment. The transmission and reception point may be configured to communicate in one direction along a movement direction of the served user equipment. A first user equipment may be located at a first section of a vehicle and a second user equipment may be located at a second section of the vehicle, wherein the first section and the second section are distant from each other. The compensation for the Doppler Effect may include compensation for the Doppler Effect in a wireless link communication to the first and second served user equipments. The method may further include assigning first frequency resources to the first user equipment and assigning second frequency resources to the second user equipment, wherein the first and second frequency resources are Doppler Effect compensated. The method may further include assigning first time resources to the first user equipment and assigning second time resources to the second user equipment, wherein the first and second time resources are Doppler Effect compensated. The method may further include segmenting a carrier into a first component carrier assigned to the first user equipment and segmenting the carrier into a second component carrier assigned to the second user equipment. The method may further include transmitting the speed related parameter of the served user equipment to a neighboring transmission and reception point, based on a frequency shift threshold value. The method may further include transmitting the speed related parameter to the served user equipment.

Some embodiments pertain to a mobile telecommunications system method for a user equipment served by a transmission and reception point, comprising receiving a speed related parameter of the served user equipment form the transmission and reception point; and compensating for a Doppler effect in a wireless link communication to the transmission and reception point, based on the otained speed related parameter.

In some embodiments, a serving TRP signals one or more speed related parameters of UEs attached to (or inside) of a vehicle, e.g. high speed train, to its neighboring TRPs. For instance, the TRPs are part of RAN 1, as has also been discussed above, for example, in association with FIGS. 1 to 4. The neighboring TRPs would then use these speed related parameters to compensate for the high Doppler experienced by the UE in the high speed train when these TRPs serve these UEs. For example, if the actual Doppler experienced by the UE is $f_D$ and using the said parameters, the neighboring TRP obtained a compensation Doppler of $f_C$, the neighboring TRP would transmit its signal to the UE by offsetting the frequency by $-f_C$ so that the resultant Doppler experienced by the UE is $f_R = f_D - f_C$, so that the absolute value of $f_R$ is much smaller than that of $f_D$ such that it is within the tolerance of the UE receiver, as discussed above. It should be appreciated that the compensation Doppler $f_C$ usage is up to the TRP implementation. For example, it can be used as an initial value and is adjusted when more measurements are obtained from the UE.

Figure 6:
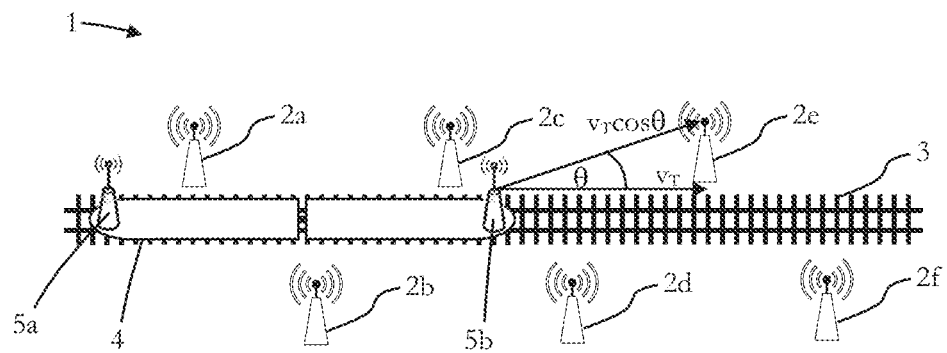
FIG. 6 illustrates a Doppler Effect in the network of FIG. 1.
Figure 7:
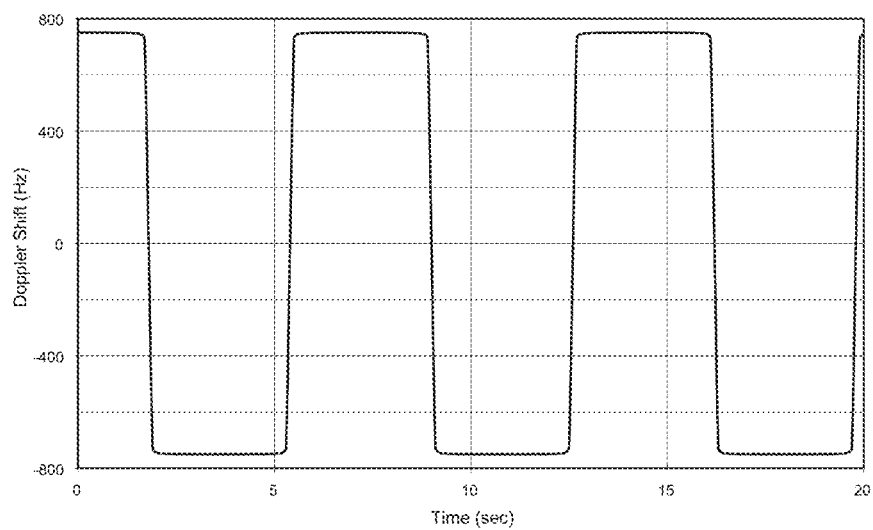
FIG. 7 illustrates a change of a Doppler Effect of a moving train.

As described previously and under reference of FIG. 6, which basically illustrates the RAN 1 as discussed in detail above (FIGS. 1 to 4), the Doppler is a function of the relative speed between transmitter and receiver and hence it is dependent upon the angle between the train direction and the TRP. As is illustrated in FIG. 6, θ is the angle between the direction of travel of the train 4 and the relative direction between the train 4 and the TRP 2c in FIG. 6.

The relative speed is therefore $v_T \cos\theta$, where $v_T$ is the speed of the train 4. As can be observed, the speed of the train 4 relative to, for example, the TRP 2e, i.e. Doppler, changes as the train 4 moves along track 3. The Doppler would change from very high positive when it is moving towards the TRP to very high negative when it moves away from the TRP, such as TRP 2e. This behavior is also illustrated in FIG. 5, which illustrates a Doppler change of the test scenario in LTE, wherein the train moves past multiple TRPs (see also TS36.101 mentioned above).

As mentioned, the speed related parameters can include the maximum speed of the train (or the maximum Doppler). This embodiment recognizes that the relative speed (i.e. Doppler) changes as the train moves past a serving TRP, e.g. train 4 with UE 5b passing TRP 2e, and therefore the maximum speed/Doppler would represent the worst case that the neighboring TRP, e.g. TRP 2f, would need to prepare to compensate for. This embodiment also recognizes that when the UE performs handover to a neighboring TRP, e.g. UE 5b performs handover from TRP 2e to TRP 2f, the angle θ (angle between direction of train and relative direction of train with TRP) is likely to be at its smallest value when the target TRP is furthest away from the train, which would lead to high (or highest) Doppler between the train and the TRP. The maximum speed/Doppler would therefore allow the target TRP to use a high Doppler compensation for the UE that is handing over to it.

In another embodiment, the speed related parameters include an average absolute Doppler. The average value can be used by the target TRP as an initial Doppler compensation after which it can start measuring the UE's Doppler and adjust accordingly.

In still another embodiment, the speed related parameters also indicate whether the train is accelerating or slowing down. The acceleration or deceleration can be indicated, thereby allowing the larger TRP to adjust its Doppler compensation accordingly. For example, instead of applying the maximum Doppler for the UE, the target TRP can apply the average Doppler value if it knew the train is slowing down (e.g. when it is close to a station).

In another embodiment, the UE, e.g. UE 5b measures its speed, or Doppler, based on the received radio signal from the serving TRP, e.g. TRP 2e, and signals that speed, or Doppler measurement to the serving TRP.

In another embodiment, the UE measures its speed based on non-radio measurements, such as GPS or speedometer, and signals that speed to the serving TRP.

In an embodiment, the serving TRP measures the UE speed, based on measurements on the received signal.

In an embodiment, TRPs may be either unidirectional or bidirectional, whereby a unidirectional TRP points in one direction along a linear track and a bidirectional TRP points in both directions (forwards and backwards) along a linear track.

When all TRPs are unidirectional, the signaled speed related parameters, e.g. including the Doppler shift, from the source TRP can be used directly by the target TRP (assuming the unidirectional TRPs point in the same direction).

When all TRPs are bidirectional, the signaled speed related parameters, e.g. including the Doppler shift, from the serving TRP is inverted in sign when it is applied by the target TRP (noting that during a handover between bidirectional TRPs, a negative Doppler is observed by the source TRP as the train recedes from the source TRP, but a positive Doppler is observed by the target TRP as the train approaches the target TRP).

When there is a mixed deployment of bidirectional and unidirectional TRPs, the source TRP indicates whether the signaled speed related parameters, e.g. including the Doppler shift, are associated with a train that is approaching the TRP or a train that is receding from the TRP.

Figure 8:
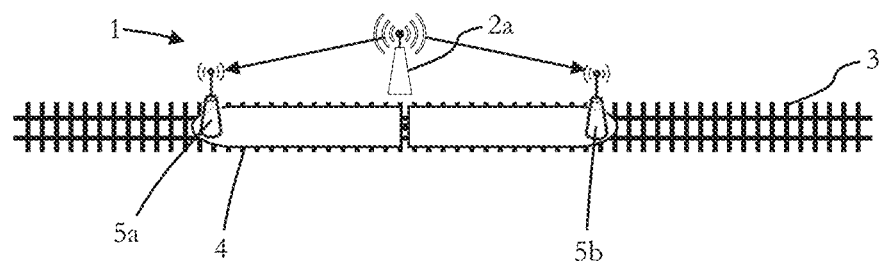
FIG. 8 illustrates the Doppler Effect for two user equipments passing a transmission and reception point.

In another embodiment, the high speed train has multiple UEs, for example the first carriage in the train has a UE 5a and the last carriage in the train has a UE 5b, as illustrated in FIG. 8. In this case, a TRP may compensate for both positive and negative Doppler. For the example shown in FIG. 8, the TRP 2a compensates for positive Doppler towards UE 5a (left arrow), since UE 5a is approaching the TRP 2a, and the TRP 2a compensates for negative Doppler from UE 5b, since UE 5b is receding from the TRP 2a. The TRP 2a can compensate for both positive and negative Doppler by, for example:

1) Assigning some frequency resources to be compensated with positive Doppler and other frequency resources to be compensated with negative Doppler. The split between positive and negative Doppler resources can be semi-static (e.g. through RRC signaling, such as UE specific or system information signaling) or dynamic. A guard band may be applied between the positive and negative Doppler resources to control interference between the resources.

2) Assigning some time resources (e.g. subframes) to be compensated with positive Doppler and other time resources to be compensated with negative Doppler.

3) Segmenting the carrier into component carriers, e.g. according to carrier aggregation techniques. The component carriers may then have either positive or negative Doppler compensation applied to them. This allows a single TRP to transmit copies of system information with both positive and negative Doppler compensation. The component carriers can be activated and deactivated as the train passes the TRP. For example, when all UEs of the train are approaching the TRP, all component carriers are assigned with positive Doppler compensation; as the train passes the TRP, some of the component carriers are switched to operating with negative Doppler compensation to support UEs on the train that are receding from the TRP.

It should be appreciated that the above embodiments relating to the speed related parameters can be combined such that all the speed related parameters discussed above are signaled or only a subset of them is signaled to neighboring TRP(s).

Figure 9:
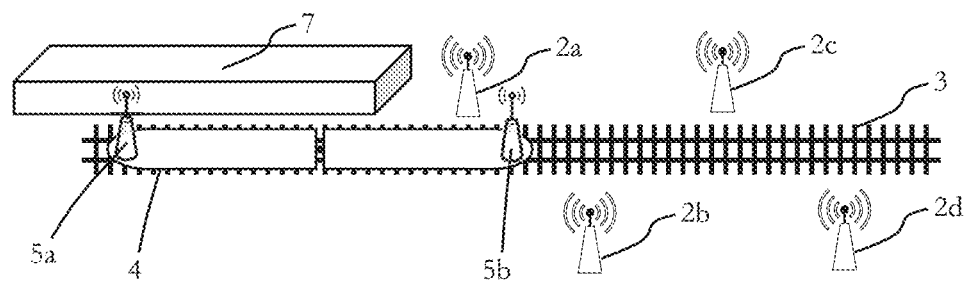
FIG. 9 illustrates the Doppler Effect of a train starting from a train station.

In some embodiments, a train would start from a stationary position and would accelerate to its desired speed. Hence, the Doppler Effect is expected to start from a small value and increase as the train moves along the track. For example, as illustrated in FIG. 9, the train 4 stops at the train station 7 and a TRP, such as TRP 2a, would observe very small Doppler from the train 4. As the train moves away from the train station 7, the Doppler would increase, i.e. TRP 2d would observe a larger Doppler than that observed by TRP 2c, TRP 2c would observe a larger Doppler than that observed by TRP 2b and TRP 2b would observe a larger Doppler than that observed by TRP 2a.

As mentioned, a UE, e.g. UE 5a, 5b, is designed to tolerate up to a maximum Doppler $\pm f_{UE}$ and hence Doppler compensation by the TRP is not required if it is within the UE tolerance. Recognizing this point, in another embodiment, a serving TRP will only signal the said speed related parameters to its neighboring TRP if the observed absolute Doppler is above a threshold $f_{THRES}$. Similarly, if a train decelerates when it is stopping in a station, its absolute Doppler would reduce to below the said threshold $f_{THRES}$ and the TRP would not need to report this to the other neighboring TRPs that are closer to the station 7.

Figure 10:
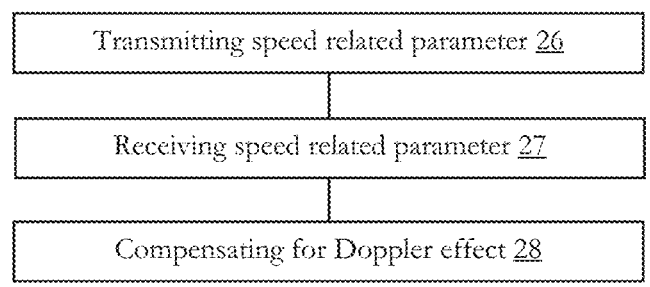
FIG. 10 illustrates a mobile telecommunications system method.

In another embodiment, which pertains to a method 25 for communication between a TRP and a user equipment as illustrated in FIG. 10, the network signals at 26 a speed related parameter including Doppler compensation to the UE, e.g. UE 5a and/or 5b. This can be implemented in the form of broadcast or dedicated signaling. The signaled speed related parameter value received at 27 from the UE is used by the UE for its uplink transmission where the UE offsets its frequency by the signaled Doppler compensation value and thereby compensates for the Doppler effect at 28. The UE would typically assume that the frequency offsets in the downlink and uplink are similar and hence, if the downlink signal is Doppler compensated, then the UE may transmit its uplink assuming a small frequency offset which results in a large frequency offset due to the high Doppler at the TRP receiver. Hence, this embodiment reduces the Doppler in the uplink. Moreover, the network may only signal speed related parameters, such as a Doppler compensation value, to the UE if the observed Doppler from the UE exceeds a threshold $f_{THRES}$.

Figure 11:
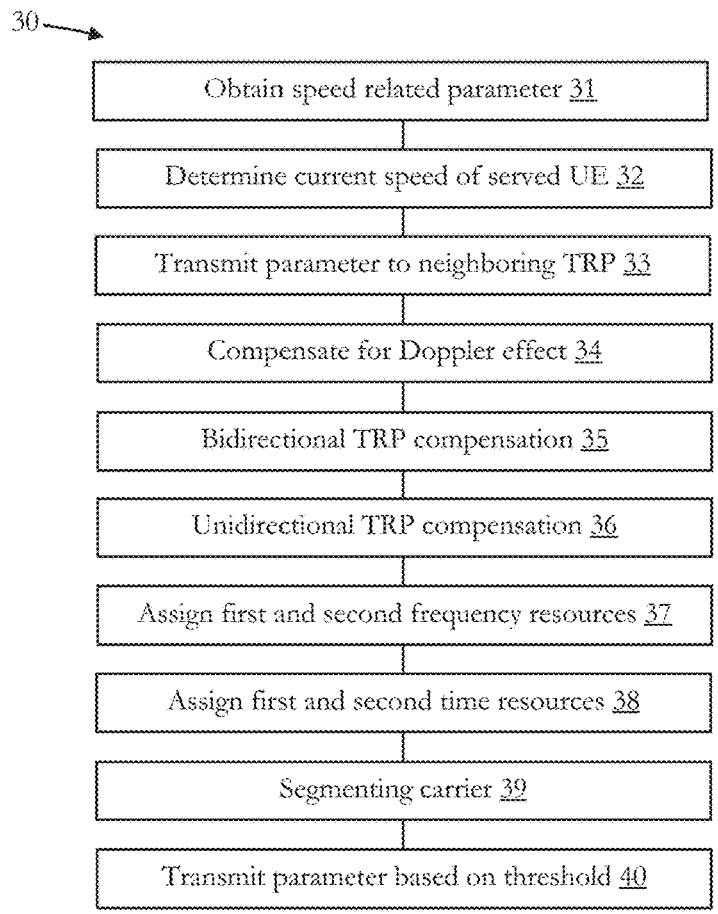
FIG. 11 illustrates a mobile telecommunications system method.

In the following, the mobile telecommunicaoons method for a transmission and reception point serving a user equipment, as discussed above, is explained under reference of FIG. 11.

At 31, a speed related parameter of the served user equipment is obtained, as discussed above. The speed related parameter is indicative of a Doppler effect, of a maximum speed of the user equipment or the like, wherein the maximum speed is the maximum speed between a transmission and reception point and the served user equipment. The speed related parameter can also be an indicator of an average Doppler frequency shift, as discussed above.

At 32, a current speed of the served user equipment is determined, as discussed above, such that based on the determined speed, for example, the speed related parameter can be measured. As discussed, the current speed can be determined based on a measurement performed by the user equipment, it can be determined based on a radio measurement between the user equipment and the serving transmission and reception point and it can be determined based on a location information.

At 33, the speed related parameter of the served user equipment is transmitted to at least one neighboring transmission and reception point.

At 34, compensating for a Doppler effect in a wireless link communication to the served user equipment is based on the measured speed related parameter. As discussed, the compensation is further based on the current speed and the compensation for the Doppler effect can include compensation for the Doppler effect in a wireless link communication to the first and second served user equipments, wherein a first user equipment is located at a first section of a vehicle and a second user equipment is located at a second section of the vehicle, wherein the first section and the second section are distant from each other. The Doppler effect compensation may differ for the first and second wireless links to the first and second user equipments, respectively, as discussed above, e.g. by applying a negative compensation to the first user equipment and a positive compensation to the second user equipment (or vice versa).

As discussed above, the transmission and reception point(s) can be configured to communicate in a forward and backward direction along a movement direction of the served user equipment, which is also referred to as bidirectional TRP above or the transmission and reception point(s) can be configured to communicate in one direction along a movement direction of the served user equipment, which is also referred to as unidirectional TRP above.

Hence, at 35, the Doppler effect compensation for bidirectional TRPs can include, as discussed above, the signaling of the speed related parameters and inverting the sign of the Doppler shift at the target TRP. At 36, the Doppler effect compensation for unidirectional TRPs can include, as discussed above, the signaling of the speed related parameters and the application of the Doppler shift at the target TRP without inverting a sign.

At 37, the method 30 can include assigning first frequency resources to the first user equipment and assigning second frequency resources to the second user equipment, wherein the first and second frequency resources are Doppler effect compensated, as discussed above. The Doppler effect compensation for the first and second frequency resources may differ in the way discussed above, e.g. by applying a negative Doppler shift for the first frequency resource and a positive Doppler shift for the second frequency resources (or vice versa).

At 38, the method 30 can include assigning first time resources to the first user equipment and assigning second time resources to the second user equipment, wherein the first and second time resources are Doppler effect compensated, as discussed above, e.g. by applying positive Doppler effect compensation for the first time resource and negative Doppler shift compensation to the second time resource, or vice versa.

At 39, the method 30 can include segmenting a carrier into a first component carrier assigned to the first user equipment and segmenting the carrier into a second component carrier assigned to the second user equipment, as discussed above, e.g. by applying positive Doppler effect compensation for the first component carrier and negative Doppler shift compensation for the second component carrier, or vice versa.

At 40, the method 30 can include transmitting the speed related parameter of the served user equipment to a neighboring transmission and reception point, based on a frequency shift threshold value, as discussed above.

In some embodiments, only one of steps 37 to 39 is implemented. Moreover, the ordering of steps 37 to 39 can be freely chosen and the skilled person will adapt it accordingly. Furthermore, only a subset of steps 37 to 39 can be implemented in some embodiments, e.g. steps 37 and 38, steps 37 and 39, steps 38 and 39, etc.

Figure 12:
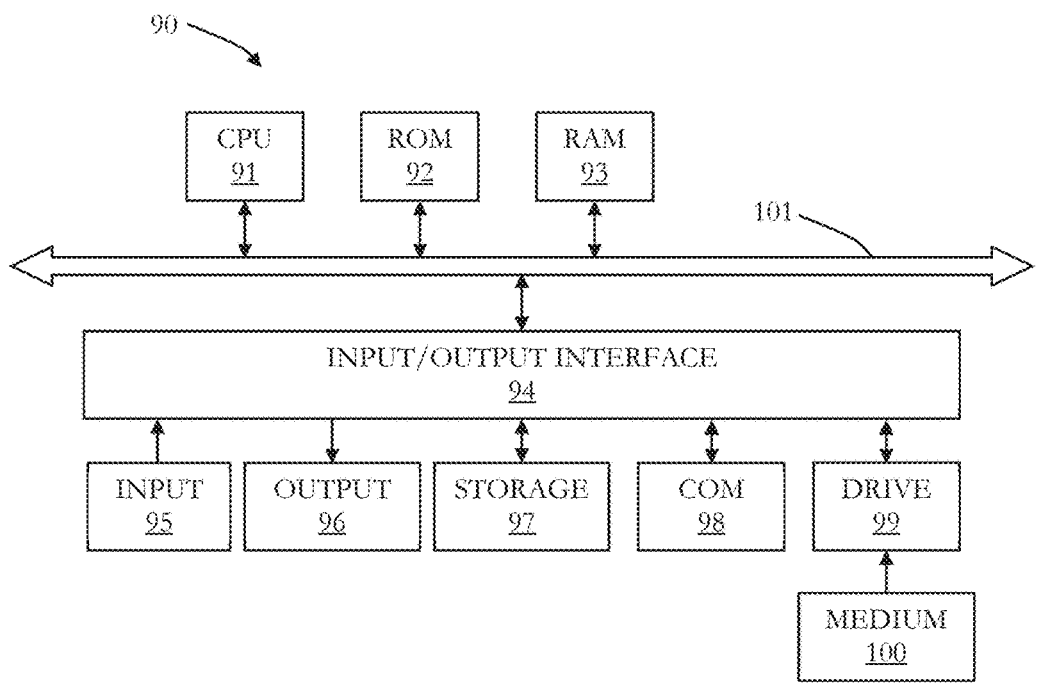
FIG. 12 schematically illustrates a computer which can implement a transmission and reception point, user equipment, base station or other components described in this disclosure.

In the following, an embodiment of a general purpose computer 90 is desenbed under reference of FIG. 12. The computer 90 can be implemented such that it can basically function as any type of base station or new radio base station, transmission and reception point, or user equipment as described herein. The computer has components 91 to 100, which can form a circuitry, such as anyone of the circuitries of the base station, and user equipment, as desenbed herein.

Embodiments which use software, firmware, programs or the like for performing the methods as described herein can be installed on computer 90, which is then configured to be suitable for the concrete embodiment.

The computer 90 has a CPU 91 (Central Processing Unit), which can execute various types of procedures and methods as described herein, for example, in accordance with programs stored in a read-only memory (ROM) 92, stored in a storage 97 and loaded into a random access memory (RAM) 93, stored on a medium 100 which can be inserted in a respective drive 99, etc.

The CPU 91, the ROM 92 and the RAM 93 are connected with a bus 101, which in turn is connected to an input/output interface 94. The number of CPUs, memories and storages is only exemplary, and the skilled person will appreciate that the computer 90 can be adapted and configured accordingly for meeting specific requirements which arise, when it functions as a base station, and user equipment.

At the input/ourput interface 94 several components are connected: an input 95, an output 96, the storage 97, a communication interface 98 and the drive 99, into which a medium 100 (compact disc, digital video disc, compact flash memory, or the like) can be inserted.

The input 95 can be a pointer device (mouse, graphic table, or the like), a keyboard, a microphone, a camera, a touchscreen, etc.

The output 96 can have a display (liquid crystal display, cathode ray tube display, light emittance diode display, etc.), loudspeakers, etc.

The storage 97 can have a hard disk, a solid state drive and the like.

The communication interface 98 can be adapted to communicate, for example, via a local area network (LAN), wireless local area network (WLAN), mobile telecommunications system (GSM, UMTS, LTE, etc.), Bluetooth, infrared, etc.

It should be noted that the description above only pertains to an example configuration of computer 90. Alternative configurations may be implemented with additional or other sensors, storage devices, interfaces or the like. For example, the communication interface 98 may support other radio access technologies than the mentioned UMTS and LTE.

When the computer 90 functions as a base station, the communication interface 98 can further have a respective air interface (providing e.g. E-UTRA protocols OFDMA (downlink) and SC-FDMA (uplink)) and network interfaces (implementing for example protocols such as S1-AP, GTP-U, S1-MME, X2-AP, or the like). Moreover, the computer 90 may have one or more antennas and/or an antenna array. The present disclosure is not limited to any particularities of such protocols.

The methods as described herein are also implemented in some embodiments as a computer program causing a computer and/or a processor to perform the method, when being carried out on the computer and/or processor. In some embodiments, also a non-transitory computer-readable recording medium is provided that stores therein a computer program product, which, when executed by a processor, such as the processor described above, causes the methods described herein to be performed.

It should be recognized that the embodiments describe methods with an exemplary order of method steps. The specific order of method steps is, however, given for illustrative purposes only and should not be construed as binding.

The method can also be implemented as a computer program causing a computer and/or a processor to perform the method, when being carried out on the computer and/or processor. In some embodiments, also a non-transitory computer-readable recording medium is provided that stores therein a computer program product, which, when executed by a processor, such as the processor described above, causes the method described to be performed.

All units and entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below.

(1) A mobile telecommunications system transmission and reception point comprising circuitry configured to:
  receive a status indicator; and
  switch between an active state and an inactive state in response to the received status indicator.

(2) The mobile telecommunications system transmission and reception point of (1), wherein the active state includes at least one of receiving and transmitting data.

(3) The mobile telecommunications system transmission and reception point of (1) or (2), wherein the inactive state includes at least one of discontinuous reception mode and discontinuous transmission mode.

(4) The mobile telecommunications system transmission and reception point of anyone of (1) to (3), wherein the inactive state includes turning off at least one of a transmitter and receiver.

(5) The mobile telecommunications system transmission and reception point of anyone of (1) to (4), wherein the circuitry is further configured to transmit a status indicator.

(6) The mobile telecommunications system transmission and reception point of anyone of (1) to (5), wherein the circuitry is further configured to switch into the inactive state after a predetermined time.

(7) The mobile telecommunications system transmission and reception point of anyone of (1) to (6), wherein the status indicator includes at least one of: a command to switch in the inactive or active state, connection state information, information about a completed handover procedure, end of vehicle information.

(8) A mobile telecommunications system transmission and reception point comprising circuitry configured to:
transmit a status indicator for switching another transmission and reception point between an active state and an inactive state.

(9) The mobile telecommunications system transmission and reception point of (8), wherein the circuitry is further configured to transmit the status indicator to a neighboring transmission and reception point.

(10) The mobile telecommunications system transmission and reception point of (8) or (9), wherein the circuitry is further configured to detect a mobility of a user equipment, the user equipment being mounted to a vehicle.

(11) The mobile telecommunications system transmission and reception point of (10), wherein the vehicle is a train.

(12) The mobile telecommunications system transmission and reception point of (10) or (11), wherein the circuitry is further configured to detect a movement direction of the vehicle.

(13) The mobile telecommunications system transmission and reception point of anyone of (8) to (12), wherein the other transmission and reception point is neighboring to the mobile telecommunications system transmission and reception point.

(14) The mobile telecommunications system transmission and reception point of anyone of (10) to (13), wherein the status indicator is transmitted to a number of other transmission and reception points, and the number of the other transmission and reception points depends on the velocity of the vehicle.

(15) A mobile telecommunications system base station comprising multiple remote radio heads and circuitry configured to:
receive a status indicator; and
deactivate selectively the multiple remote radio heads based on the received status indicator.

(16) The mobile telecommunications system base station of (15), wherein the status indicator is received from a neighboring base station.

(17) The mobile telecommunications system base station of (16), wherein deactivation of the multiple remote radio heads is further based on a geographical relationship to the neighboring base station.

(18) The mobile telecommunications system base station of (16) or (17), wherein the status indicator indicates a last activated remote radio head of the neighboring base station.

(19) The mobile telecommunications system base station of anyone of (15) to (18), wherein the outermost remote radio heads stay in the active state.

(20) The mobile telecommunications system base station of anyone of (15) to (19), wherein the circuitry is further configured to detect an active remote radio head based on a signal measurement.

(21) The mobile telecommunications system base station of (20), wherein the signal measurement includes at least one of: receiving uplink signals, sounding reference signals, physical uplink shared channel, ACK/NACK feedback signaling.

(22) The mobile telecommunications system base station of (20) or (21), wherein deactivation of the multiple remote radio heads is further based on the signal measurement.

(23) The mobile telecommunications system base station of anyone of (20) to (22), wherein the signal measurement is performed by a user equipment.

(24) The mobile telecommunications system base station of anyone of (20) to (23), wherein the remote radio heads are uniquely identifiable.

(25) A mobile telecommunications system method comprising:
obtaining neighbor cell information including priority information of neighboring cells to be measured; and
measuring cells based on the priority information.

(26) The mobile telecommunications system method of (25), wherein the neighboring cells are located along a direction of a travelling vehicle.

(27) The mobile telecommunications system method of (26), wherein the vehicle is a train.

(28) The mobile telecommunications system method of (26) or (27), wherein the neighboring cell information is indicative of cells for vehicles having different travel directions.

(29) The mobile telecommunications system method of (28), wherein the neighboring cell information is separated for vehicles having different travel directions.

(30) The mobile telecommunications system method of anyone of (26) to (29), wherein the neighboring cell information is updated based on the travelling direction.

(31) The mobile telecommunications system method of anyone of (25) to (30), wherein the neighboring cell information is obtained by a neighboring cell measurement.

(32) The mobile telecommunications system method of (31), wherein a user equipment performs the neighboring cell measurement.

(33) A mobile telecommunications system method for a transmission and reception point serving a user equipment, comprising:
obtaining a speed related parameter of the served user equipment; and
compensating for a Doppler effect in a wireless link communication to the served user equipment, based on the obtained speed related parameter.

(34) The mobile telecommunications system method of (33), wherein the speed related parameter is indicative of a Doppler effect.

(35) The mobile telecommunications system method (33) or (34), wherein the speed related parameter is indicative of a maximum speed of the user equipment.

(36) The mobile telecommunications system method of (35), wherein the maximum speed is the maximum speed between a transmission and reception point and the served user equipment.

(37) The mobile telecommunications system method of anyone of (33) to (36), wherein the speed related parameter is an indicator of an average Doppler frequency shift.

(38) The mobile telecommunications system method of anyone of (33) to (37), further composing transmitting the speed related parameter of the served user equipment to at least one neighboring transmission and reception point.

(39) The mobile telecommunications system method of anyone of (33) to (38), further comprising determining a current speed of the served user equipment.

(40) The mobile telecommunications system method of (39), wherein the compensation is further based on the current speed.

(41) The mobile telecommunications system method of (39) or (40), wherein the current speed is determined based on a measurement performed by the user equipment.

(42) The mobile telecommunications system method of (41), wherein the current speed is determined based on a radio measurement between the user equipment and the serving transmission and reception point.

(43) The mobile telecommunications system method of (41) or (42), wherein the current speed is determined based on a location information.

(44) The mobile telecommunications system method of anyone of (33) to (43), wherein the transmission and reception point is configured to communicate in a forward and backward direction along a movement direction of the served user equipment.

(45) The mobile telecommunications system method of anyone of (33) to (44), wherein the transmission and reception point is configured to communicate in one direction along a movement direction of the served user equipment.

(46) The mobile telecommunications system method of anyone of (33) to (45), wherein a first user equipment is located at a first section of a vehicle and a second user equipment is located at a second section of the vehicle, wherein the first section and the second section are distant from each other.

(47) The mobile telecommunications system method of (46), wherein compensation for the Doppler effect includes compensation for the Doppler effect in a wireless link communication to the first and second served user equipments.

(48) The mobile telecommunications system method of (47), further comprising assigning first frequency resources to the first user equipment and assigning second frequency resources to the second user equipment, wherein the first and second frequency resources are Doppler effect compensated.

(49) The mobile telecommunications system method of (47) or (48), further comprising assigning first time resources to the first user equipment and assigning second time resources to the second user equipment, wherein the first and second time resources are Doppler effect compensated.

(50) The mobile telecommunications system method of (47), (48) or (49), further comprising segmenting a carrier into a first component carrier assigned to the first user equipment and segmenting the carrier into a second component carrier assigned to the second user equipment.

(51) The mobile telecommunications system method of anyone of (33) to (50), further comprising transmitting the speed related parameter of the served user equipment to a neighboring transmission and reception point based on a frequency shift threshold value.

(52) The mobile telecommunications system method of anyone of (33) to (51), further comprising transmitting the speed related parameter to the served user equipment.

(53) A mobile telecommunications system method for a user equipment served by a transmission and reception point, comprising:
receiving a speed related parameter of the served user equipment form the transmission and reception point; and
compensating for a Doppler effect in a wireless link communication to the transmission and reception point, based on the obtained speed related parameter.

(54) A computer program comprising program code causing a computer to perform the method according to anyone of (33) to (53), when being carried out on a computer.

(55) A non-transitory computer-readable recording medium that stores therein a computer program product, which, when executed by a processor, causes the method according to anyone of (33) to (53) to be performed.

The invention claimed is:

1. A mobile telecommunications system method for a transmission and reception point serving a user equipment, comprising:
obtaining, by the transmission and reception point, a speed related parameter of the served user equipment;
transmitting an activation command and the speed related parameter of the served user equipment to at least one neighboring transmission and reception point; and
compensating, at least at one of the transmission and reception point and the at least one neighboring transmission and reception point, for a Doppler effect in a wireless link communication from the transmission and reception point to the served user equipment, based on the obtained speed related parameter,
wherein compensating for the Doppler effect in the wireless link communication includes compensating a subset of frequency resources of the wireless link communication for a positive Doppler effect and compensating another subset of frequency resources of the wireless link communication for a negative Doppler effect.

2. The mobile telecommunications system method of claim 1, wherein the speed related parameter is indicative of a Doppler effect.

3. The mobile telecommunications system method of claim 1, wherein the speed related parameter is indicative of a maximum speed of the user equipment.

4. The mobile telecommunications system method of claim 3, wherein the maximum speed is the maximum speed between a transmission and reception point and the served user equipment.

5. The mobile telecommunications system method of claim 3, wherein the speed related parameter is an indicator of an average Doppler frequency shift.

6. The mobile telecommunications system method of claim 3, further comprising determining a current speed of the served user equipment.

7. The mobile telecommunications system method of claim 6, wherein the compensation is further based on the current speed.

8. The mobile telecommunications system method of claim 6, wherein the current speed is determined based on a measurement performed by the user equipment.

9. The mobile telecommunications system method of claim 1, wherein the transmission and reception point is configured to communicate in a forward and backward direction along a movement direction of the served user equipment.

10. The mobile telecommunications system method of claim 1, wherein the transmission and reception point is configured to communicate in one direction along a movement direction of the served user equipment.

11. The mobile telecommunications system method of claim 1, wherein a first user equipment is located at a first section of a vehicle and a second user equipment is located at a second section of the vehicle, wherein the first section and the second section are distant from each other.

12. The mobile telecommunications system method of claim 8, wherein the measurement performed by the user equipment is a measurement based on global positioning (GPS) data.

13. The mobile telecommunications system method of claim 8, wherein the measurement performed by the user equipment is performed on received signals transmitted from the transmission and reception point.

14. The mobile telecommunications system method of claim 7, wherein the compensation is further based on whether the current speed is increasing or decreasing.

15. The mobile telecommunications system method of claim 14, wherein the wireless link communication is compensated using a maximum Doppler frequency shift when the current speed is increasing, and the wireless link communication is compensated using an average Doppler frequency shift when the current speed is decreasing.

16. The mobile telecommunications system method of claim 1, wherein compensating for the Doppler effect in the wireless link communication includes offsetting a frequency of the wireless link communication by an offset value determined based on the speed related parameter.

17. The mobile telecommunications system method of claim 16, wherein the offset value is updated upon receipt of additional speed related parameters from the user equipment.

18. The mobile telecommunications system method of claim 1, wherein compensating for the Doppler effect in the wireless link communication includes accounting for an angle between a direction of travel of the user equipment and a relative direction between the user equipment and the transmission and reception point.

19. The mobile telecommunications system method of claim 11, wherein the vehicle is a train.

20. The mobile telecommunications system method of claim 19, wherein the user equipment travels along a predetermined fixed path according to tracks upon which the train travels.

* * * * *